Figure 1:
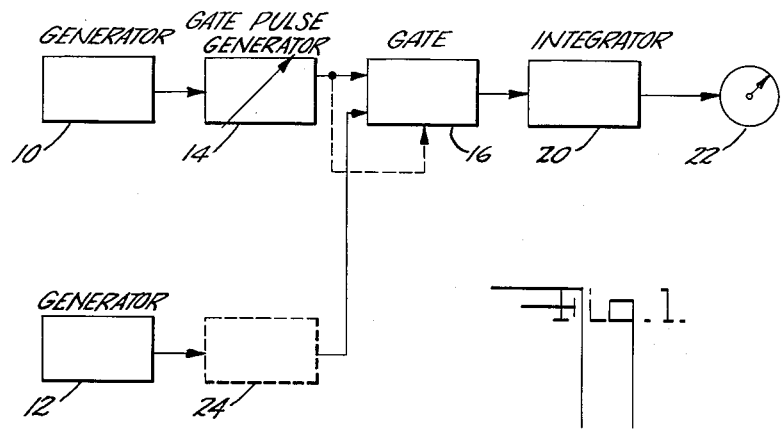

Aug. 21, 1962 W. F. CRONIN 3,049,912
TIME INTERVAL MEASURING DEVICE
Filed Jan. 16, 1957 3 Sheets-Sheet 1

INVENTOR.
WILLIAM F. CRONIN
BY
Blair and Spencer
ATTORNEYS

INVENTOR.
WILLIAM F. CRONIN
BY
Blair and Spencer
ATTORNEYS

Aug. 21, 1962 W. F. CRONIN 3,049,912
TIME INTERVAL MEASURING DEVICE
Filed Jan. 16, 1957 3 Sheets-Sheet 3
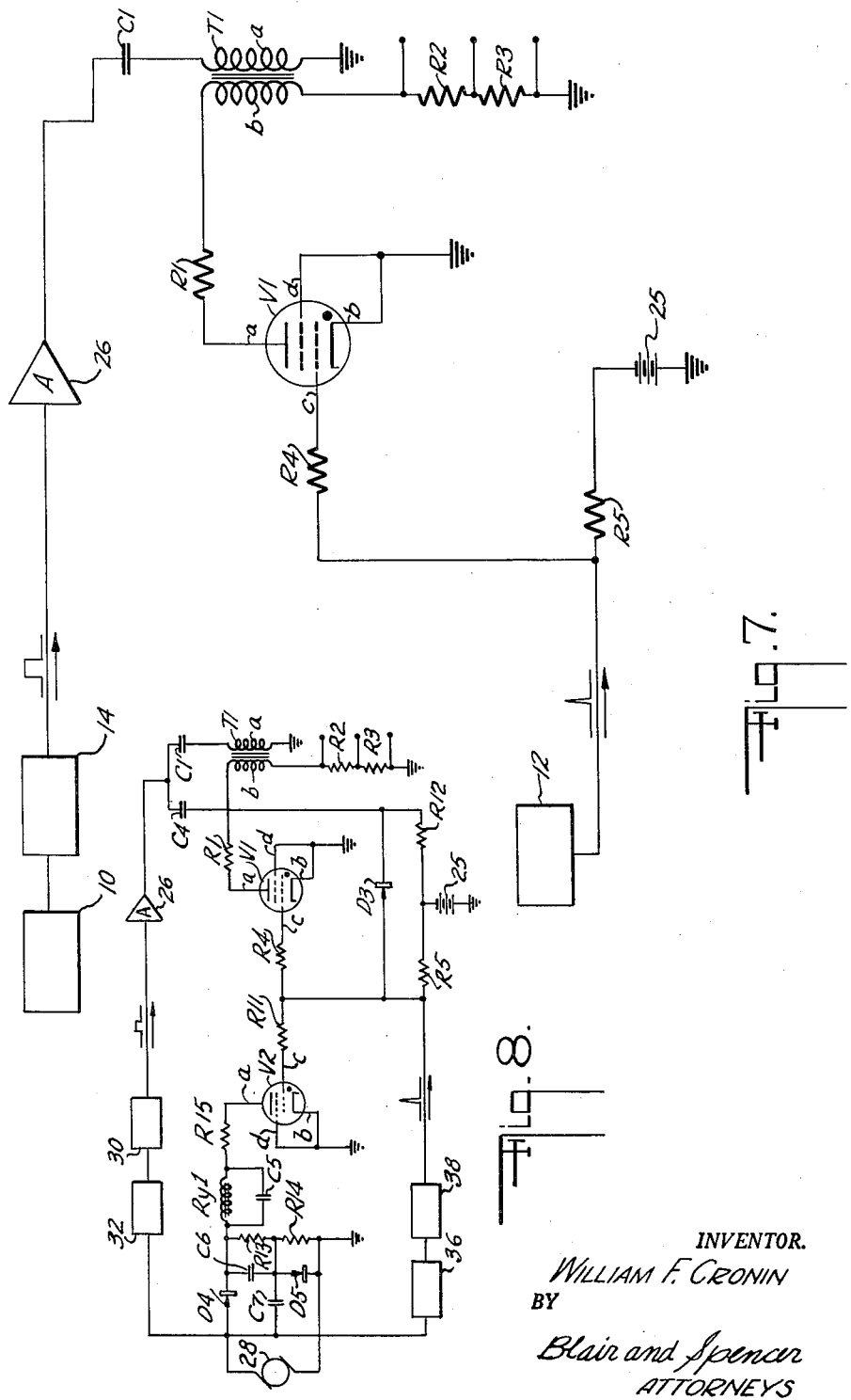
INVENTOR.
WILLIAM F. CRONIN
BY
Blair and Spencer
ATTORNEYS

United States Patent Office 3,049,912
Patented Aug. 21, 1962

3,049,912
TIME INTERVAL MEASURING DEVICE
William F. Cronin, Rye, N.Y., assignor to Branson
Instruments, Inc., Stamford, Conn.
Filed Jan. 16, 1957, Ser. No. 634,442
12 Claims. (Cl. 73—67.9)

This invention relates to a coincidence system for comparing the time relation of separately occurring events. More particularly, it relates to a coincidence system whose output is a measure of the amount of the difference in timing of such events and to novel circuitry which may be used in such a system.

Coincidence systems are generally used to determine the concurrence of two or more separate events. In their simplest form they comprise switching elements or gates of varying complexity having two or more controls or inputs which must be activated simultaneously to form a conducting path therethrough. For example, the contacts of two separate relays may be connected in a series circuit and electric signals generated in response to two separate events may be applied to the windings of the relays. Whenever both signals occur at the same time, both relays close and a conducting path is formed through such circuit, i.e., a signal appears in the output of the system. Alternatively, the gate may be a vacuum tube having two or more grids whose voltages must be changed to allow plate conduction. Simple coincidence systems of this type find wide application in digital computers and many other devices where the concurrence of two events is to be determined. Even though the events do not coincide exactly in some instances, the signals generated may be sufficiently long to overlap and thereby actuate the gate whenever the interval between the events does not exceed a predetermined tolerance. However, prior to my invention there has been no simple way of determining such amount of time interval between them.

A related application of such coincidence systems is in determining the occurence time of a single event. Here a relatively wide gate pulse occurring at a known time is applied to one input of the gate and a rather sharp pulse generated at the event occurrence is applied to the other input; the gate thus registers an output whenever the sharp pulse occurs during a gate pulse interval. A system of this type may be used in conjunction with measuring devices, for example, for determining whether certain dimensions are within tolerance. Thus the setting of the measuring device is varied over a range of readings at a known rate to emit an output indication signal whenever its setting agrees with the quantity being measured. A gate pulse is generated to operate a gate input at the time interval when the measuring device is swept over the "in tolerance" readings; the output of the gage is applied to its other input. For all measured quantities within tolerance the signal from the measuring device occurs during the gate pulse and the gate will operate; no such operation will occur for out of tolerance readings.

Such a measuring sysem may be used with devices for measuring thickness by use of ultra-sonic waves. Thus, for example, an oscillator operating in the ultra-sonic region may have its output connected to a crystal transducer acoustically coupled to the object whose thickness is to be checked. The frequency of oscillation can then be varied until a resonance condition occurs, the resonant frequency determining the thickness of the object.

As disclosed in U.S. Patent No. 2,522,924, the frequency of the oscillator may be automatically swept back and forth over a given range, the presence of the ultrasonic resonance condition being indicated by a signal developed across a resistor in series with the plate voltage supply.

A gate pulse can be generated for the interval during which the oscillator is tuned through a given range of frequencies and then applied to a conventional gate along with a resonance indicating signal from the oscillator. Concurrence of the gate pulse and resonance signal will operate the gate to register an "in tolerance" reading. However, this system does not indicate where within tolerance a given thickness dimension lies although such information is extremely desirable, for example, where many similar measurements are to be made on objects coming off a production line. In such cases it is often desirable to know when the tolerance limits are being approached so that a process can be corrected or machinery adjusted before they are exceeded. Moreover, it is often desirable to have this information contained in an electrical signal which may be used to control automatically the process, machinery, etc. In other applications it may be desirable to obtain a continuous automatic recording of the thickness of a continuous sheet of plastic or the like being extruded, rolled, etc. As will be apparent from the later description, this may be accomplished with great facility with the apparatus to be presently described.

Accordingly, it is an object of this invention to provide an improved coincidence system which indicates the time span between separate occurrences. Another object of my invention is to provide a coincidence system of the above character whose output may readily be used to control continuous processes, tool positioning and like matters. A further object of my invention is to provide a coincidence system of the above character which may be used with a time-varying measuring device to indicate in tolerance departures from a desired dimension. Yet another object is to provide a coincidence system of the above character which also registers departures from tolerance limitations. A further object is to provide a coincidence system of the above character having relatively simple circuitry utilizing low cost components. Further objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

Figure 2:
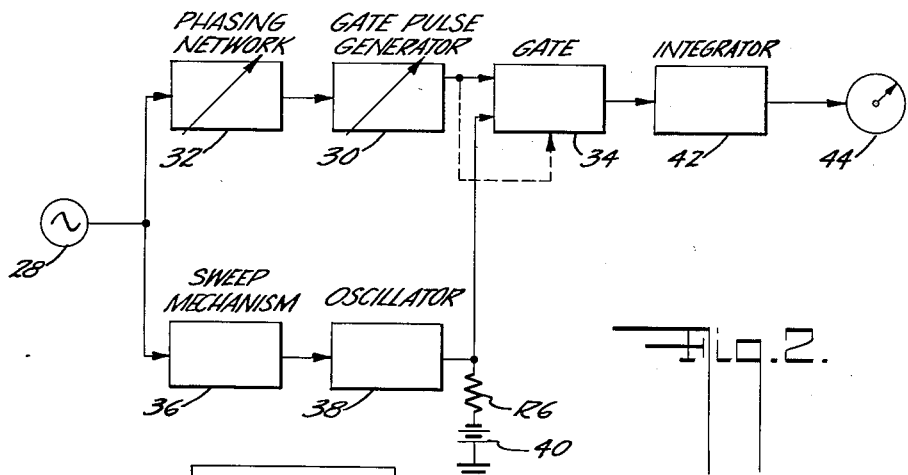
Figure 3:
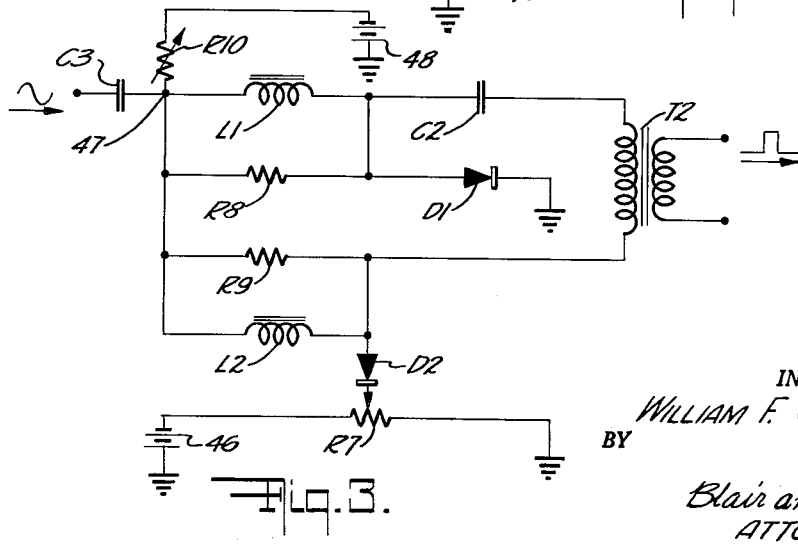
Figure 4:
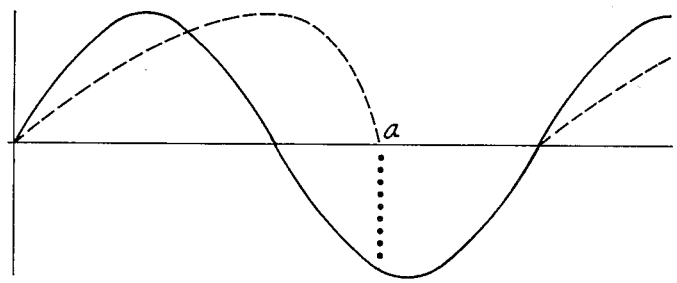
Figure 5:
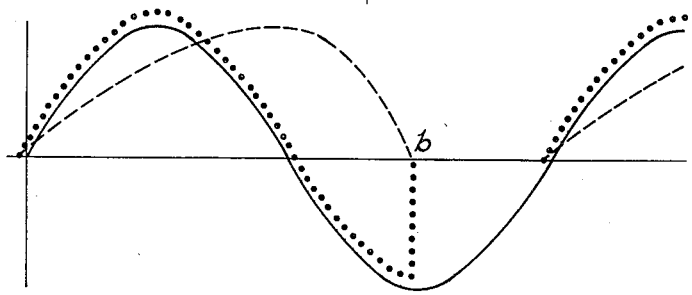
Figure 6:
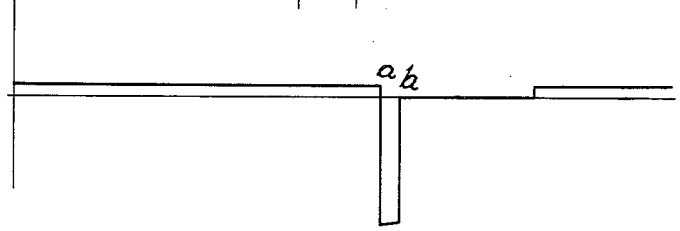

For a fuller understanding of the nature and objects of the invention, reference should be had to the following detailed description taken in connection with the accompanying drawings in which:

FIGURE 1 is a block diagram of my coincidence system,

FIGURE 2 is a block diagram of the coincidence system as used in a device for measuring the thickness of an object, FIGURE 3 is a schematic representation of the gate pulse generator circuit of FIGURE 2, FIGURE 4 is a graph illustrating the wave forms of the applied voltage to the generator of FIGURE 3, the voltage across one of the inductors therein and the current through the inductor, FIGURE 5 is a graph similar to FIGURE 4 showing the wave forms of the applied voltage, voltage across the other inductor and the current therethrough, FIGURE 6 is a graph illustrating the wave form of voltage across the input winding of the output transformer of the generator of FIGURE 3, FIGURE 7 is a schematic diagram illustrating a gate circuit which may be used in the coincidence system of FIGURES 1 and 2, and FIGURE 8 is a schematic diagram of a coincidence system for measuring the time between two events according to my invention.

In general, my coincidence system has two generators which produce signals in response to the separate occurrences of two events whose time relationship is to be measured. The signal from one generator is passed through a gate pulse generator to form a gate pulse which is in turn applied to one input of a gate; the signal from the second generator is applied to the second input of the gate. Concurrent activation of both inputs is required for operation of the gate. The first input is a conventional non-holding input which drops after the gate pulse disappears. The second input is a so-called "latching" or "holding" input which, once activated, remains so after the diminution of the signal conducted thereto. Moreover, the gate circuit is so arranged that this input cannot be activated until activation of the first input.

Thus, in accordance with my invention the signal generated in response to the first event will actuate the first input of the gate for a predetermined length of time. If the signal of the second event arrives at the second input of the gate during this interval, the gate will operate and an electric current will pass therethrough. The output of the gate is applied to a conventional integrator whose output is a measure of the time interval between the activation of the second gate input and the end of the gate pulse. This interval may be made to bear a known relation to the relative timing of the two events and such time is thus readily determined.

My coincidence system may readily be used with the ultrasonic thickness measuring device discussed above. The gate pulse is formed from the electric signal which sweeps the oscillator over the frequency range, and the signal which is applied to the second input of the gate is generated in the oscillator plate circuit as the oscillator frequency passes through the thickness-determining resonance. Since the oscillator frequency corresponds to thickness and is a fixed function of time, the thicknesses encountered during the gate pulse can readily be determined. Thus the output of the gate is integrated as described above to determine the instant during the gate pulse when the oscillator reached resonant frequency, and this determines the thickness of the object being measured.

In the above system I prefer to use an ordinary sine wave signal to sweep the oscillator frequency and, therefore, the gate pulse generator should be capable of generating a gate pulse from this type of signal. Prior circuits for doing this are rather complex and unreliable, principally because they require several vacuum tubes and many other components.

Referring now to FIGURE 1, two generators indicated at 10 and 12 provide at their outputs signals corresponding to the events whose time relationship is to be measured. Generators 10 and 12 may take any desirable form depending upon the particular application. For example, suppose the problem is to determine the time between the firing of a gun and the arrival of the bullet at the target. The generator 10 might include a pressure transducer arranged to detect the sudden increase in barrel pressure occurring upon firing, and generator 12 could then include two closely spaced wire screens shorted together by the passage of the bullet therethrough.

The output of generator 10 is coupled to a gate pulse generator 14 of any suitable type, and the gate pulse formed therein is applied to a non-latching input of a gate 16. The output of generator 12 is applied to a second latching input of the gate. This gate 16 operates only when the signal from generator 12 arrives while the non-latching input is activated by the gate pulse. Assuming such operation the gate will become conductive to pass from the gate pulse itself or an external power supply (not shown) to a conventional integrator 20; it will remain in this conductive state until the end of the gate pulse.

The integrator thus measures the total quantity of charge passed by the gate, which quantity is determinative of the length of time the gate is conductive, i.e., the interval between the activation of the latching input and the end of the gate pulse. This interval corresponds to the interval between the events being studied. Such intervals may also be translated into desired information such as distance, thickness, etc. This information may be read from a suitable meter 22 connected to the output of the integrator.

Should the signal from generator 12 arrive at the gate after the end of the gate pulse, the gate will not conduct. Moreover, the gate circuit is preferably arranged with the latching input coupled to generator 12 disabled until the beginning of the gate pulse. Thus, when the event signalled by generator 12 does not occur within the tolerance limits set, the integrator will register no output.

In many cases it is not known beforehand which of the two events will occur first. Since the operation of my coincidence system requires the gate pulse to reach the gate simultaneously or before the signal from generator 12, in such cases a delay element 24 may be inserted between generator 12 and gate 16. The delay element may be made to impose a known delay on the signal from this generator, thus insuring its arrival at the gate during the gate pulse occurrence.

In FIGURE 7 I have illustrated a circuit which may be used for the gate 16 of FIGURE 1. As shown therein, the gate pulse from pulse generator 14 is coupled through a capacitor C1 to the primary winding T1$a$ of a transformer T1. The pulse voltage is thus applied across the plate-cathode circuit of a thyratron V1 through a resistor R1. More particularly, the transformer secondary T1$b$ is connected to the thyratron plate V1$a$ through resistor R1 and is returned to ground through load resistors R2 and R3. The cathode V1$b$ of the thyratron is also grounded to complete the circuit, as is the screen grid V1$d$. The signal from generator 12, shown illustratively in FIGURE 7 as a narrow pulse, may be any signal having a steep front, i.e., short rise time. It is applied to the control grid V1$c$ through a current limiting resistor R4, while negative bias to the control grid is supplied by a battery 25 through a resistor R5. Thus, it will be seen that thyratron V1 cannot conduct until plate voltage is applied thereto concurrently with a signal on the control grid. Accordingly, the signal from generator 12 must occur during the gate pulse initiated by generator 10 for any output voltage to register across resistors R2 and R3. Moreover, once a thyratron begins conducting it will remain in that state after the removal of grid voltage until the plate voltage is also removed. Therefore the interval of conduction of the tube V1 must correspond to the interval between the two events under study. Furthermore, throughout the conduction interval the thyratron plate current remains essentially constant given constant plate supply voltage, and accordingly simple integration of the voltage developed across resistors R2 and R3 provides an accurate measurement of the time interval under study. This integration may in many cases be provided by a simple direct current meter connected across either of these resistors or coupled to them through a suitable amplifier, where the time constant of the meter is long in comparison with the length of the gate pulse. The meter may, of course, be calibrated to read directly in time units. Naturally, electrical rather than mechanical integration may be provided, and there are many conventional circuits of varying complexity for doing this. For example, if a suitable capacitor is connected across resistor R3, the voltage thereacross will be a measure of the time interval of conduction of tube V1.

I have obtained satisfactory results from my gate circuit with the following component values: Capacitor C1—25 mfd., resistor R1—27,000 ohms, R2—100,000 ohms, R3—10,000 ohms, R4—100,000 ohms, R5—4,700 ohms, transformer T1—10 to 1 voltage step-up, tube V1—type 5696 thyratron. These components may be varied within standard tolerance limits and to fit particular applications.

In certain cases the output of the gate pulse generator 14 may require a high impedance load inconsistent with the impedance seen looking into the primary of transformer T1, in which case there may be provided a cathode-follower amplifier stage 26 (FIGURE 7) between the generator 14 and the gate circuit with a high input impedance and relatively low output impedance.

While I prefer to use the thyratron gate described above, there are other arrangements which may be used to provide somewhat the same functions. Thus, a series of mechanical relays or a combination of vacuum tube flip-flops and gate tubes may be so used. As described above, the gate requires two inputs which must be concurrently activated, one input being latching, i.e., remaining activated after its activating signal has disappeared, the other input being non-latching, and the latching input being disabled until activation of the non-latching input.

An embodiment of the invention which may be used in the measurement of a physical characteristic of an object such as thickness is illustrated in FIGURE 2. Here the two events whose time relationship is to be measured are (1) ultra-sonic resonance in the object in response to a signal generated by an oscillator and (2) the beginning of the sweep of oscillator frequency across a given frequency range. Thus, a conventional sine wave generator 28 may be used to provide a signal which is fed to a gate pulse generator 30 through a phasing network 32 whose function is to be described. The gate pulse from generator 30 is in turn applied to a non-latching input of a gate 34 which could be the one described in FIGURE 7.

The output of generator 28 may be also coupled through a sweep circuit 36 to an oscillator 38 which generates an output signal applied to a latching input of gate 34. Sweep circuit 36 may be any of several known devices used to vary the output frequency of an oscillator. Thus it could be a conventional reactance tube connected across the plate tank of a tuned plate oscillator, the reactance of the tube varying in response to the change of instantaneous input voltage from generator 28; or it could be a magnetically controlled varying capacitor of the type disclosed in U.S. Patent No. 2,522,924. Thus, the output frequency of oscillator 38 is swept back and forth over a predetermined range in response to the signal from generator 28.

As disclosed in the U.S. Patent No. 2,522,924, the ultra-sonic output of oscillator 38 is acoustically coupled through a suitable transducer to the object whose thickness is to be measured. If an ultra-sonic resonance occurs in the object, corresponding to given thickness, the oscillator will draw greater plate current from the plate supply illustratively indicated by battery 40 through a suitable plate load resistor R6. Thus the change in voltage across this resistor is the indication signal applied to the latching input of gate 34. If this signal occurs during the gate pulse, the gate will conduct in the manner described above to provide an output signal which may be applied to the input of an integrator 42 (FIGURE 2). A reading may then be obtained from a suitably calibrated meter 44 coupled to the output thereof. As previously described, meter 44 may provide within certain limits both the integrating and indicating functions.

It will be seen that in the embodiment of FIGURE 2, generator 28 not only provides a signal determining the occurrence of one event, i.e., the beginning of the sweep cycle of oscillator 38, but additionally it controls the sweep itself. Thus, the ultra-sonic output frequencies of oscillator 38 corresponding to given points in the alternating cycle of the generator 28 can be fixed. This being so, the timing of the gate pulse may be made to correspond to the frequencies indicating the dimensional tolerances of the object being measured. More particularly, the phasing network 32, which may be a conventional RC network, may be adjusted to begin the generation of the gate pulse by the generator 30 at a point during the cycle of generator 28 corresponding to the minimum tolerance limit. The width of the pulse may be adjusted by controlling generator 30 in a manner to be described to determine the other tolerance limit. Accordingly, if the output signal from oscillator 38 arrives at gate 34 during the gate pulse from generator 30, the particular dimension being measured is within tolerance and the exact location therein may be determined by gate 34 and integrator 42.

The application of the circuit of FIGURE 2 to continuous measurements of a moving product such as an extruded or rolled sheet is now apparent. The transducer connected to the ultra-sonic output of the oscillator 38 may be maintained in contact with the moving sheet, and resonances corresponding to the thickness thereof will occur during successive cycles of the output signal of generator 28. During each cycle of this timing signal, a gate pulse is applied to gate 34, and if an output signal from oscillator 38 occurs during the gate pulse, it will be registered by integrator 42 and meter 44. In such an application the integrator preferably has a discharge time constant equal to several cycles of the timing signal. Accordingly, its output as indicated on meter 44 shows the average of several thickness readings. In this manner the reading of meter 44 will indicate any shift of the thickness being checked toward either of the tolerance limits and appropriate adjustments may be made to machinery. In further refinement, the output of the integrator may be applied directly to an appropriate servo-mechanism to control a process or the like.

Still referring to FIGURE 2, when using the sine wave generator 28, the input to the gate pulse generator 30 will also be in sine wave form. In FIGURE 3 I have illustrated a circuit which may be used to generate pulses in response to such an alternating input signal. As shown therein, an inductor L1 forms a conducting path from the input to ground through a diode D1, preferably a type 1N91 germanium diode. A similar conducting path across the input is formed by the series combination including inductor L2 and diode D2 similar to diode D1 and a potentiometer R7. A negative forward bias potential of approximately five volts may be supplied to the potentiometer by a battery 46. The primary T2a of an output transformer T2 is connected to the ground end of inductor L2 through a blocking capacitor C2 and also to the ground end of inductor L1. Thus the voltage across this winding and also the output signal across the secondary winding T2b is a measure of the difference in voltages across the inductors L1 and L2 resulting from the input signal to the circuit.

The operation of the pulse generator is best described with reference to FIGURES 4, 5, and 6, FIGURE 4 illustrating a hypothetical operation of inductor L1, and FIGURE 5 the actual operation of inductor L2. Thus, in FIGURES 4 and 5 the input voltage to the circuit is represented by the solid lines, the current to the inductors by the dashed lines, and the voltages across the inductors by the dotted lines. Assuming in FIGURE 4, for purposes of illustration, that a sine wave input is applied directly to the input junction 47 (FIGURE 3), the current through inductor L1 rises with the input voltage and then decreases to zero at point $a$; the location of this point depends on the value of inductor L1 and the resistances in the inductor and diode D1. The current remains at the zero level for the duration of the cycle, flow in the negative direction being prevented by the diode. The voltage across inductor L1 initially follows the input voltage (neglecting the effects of voltage drop in the resistances) until a point $a$ is reached; at this point it drops immediately to zero, since the time derivative of the current has done likewise.

As seen in FIGURE 5, the operation of the series branch through inductor L2 and diode D2 is essentially the same, except that the effect of the forward bias is to shift the voltage across inductor L2 in the positive direction and delay somewhat the time of current cutoff and voltage collapse, e.g. to point *b*. FIGURE 6 shows the voltage across the primary winding of transformer T2, which corresponds to the difference in voltage across the inductors L1 and L2. The instantaneous value of the voltage remains substantially constant until point *a* is reached, when there is a sharp departure in the negative direction. It then continues essentially constant until time *b*, when there is a sharp rise in the positive direction, after which it settles to a low level.

In actual practice I prefer to use an input capacitor C3 which affects the operation of the circuit as follows. Rectification by diodes D1 and D2 places a net charge on capacitor C3 tending to maintain a negative bias potential at junction 47, this bias being increased by battery 46. Thus both diodes are biased in the direction of cutoff, and the timing of current cutoff in both inductors is advanced. The time of the output pulse is thus also advanced. To prevent the negative bias from building up to cutoff and stopping operation of the circuit, I use a resistor R10 connected across capacitor C3, either directly or through a ground connection as shown in FIGURE 3. The value of this resistor determines the negative bias potential, and thus it may be made variable to regulate pulse timing. A stabilizing effect on the circuit is obtained by inserting a battery 48 between resistor R10 and ground. This battery, connected to apply a positive potential to the resistor, may have an output of 270 volts. In such case resistor R10 may have a nominal value of 180,000 ohms and capacitor C3 a value of 2 mfd. for a 60 cycle output signal.

In addition to control of pulse time by way of resistor R10, the width of the pulse may be regulated by potentiometer R7, which may have a value of 2000 ohms. Adjustment of this potentiometer in the positive direction permits decrease in pulse width down to as little as 1/100 of the period of the input signal for frequencies as high as 100 kilocycles per second. I have also found that the circuit of FIGURE 3 works well in converting broader pulses to narrow pulses, again being capable of pulse widths as narrow as .1 microsecond. With the use of components especially designed for high frequency operation, even narrower pulse widths should be obtainable. Pulse width may also be controlled by varying the resistance in the branches through inductors L1 and L2.

To prevent ringing from the effects of transients in the circuit, I have provided damping resistors R8 and R9 across the inductors L1 and L2. These resistors may have a value of approximately 50,000 ohms each when L1 and L2 are low loss inductors of approximately 4.5 henries each. Where high loss inductors are used, they may be self-damped, and resistances R8 and R9 may be eliminated. The blocking capacitor C2 is not critical and may have a value of .1 mfd. Because of the variations in loading which the circuit of FIGURE 3 imposes on the prior stage, it is desirable that the preceding stage should have a relatively low output impedance. Therefore, I prefer to drive the pulse forming circuit with a cathode follower amplifier stage which may be of conventional design.

In addition to the average reading of a dimension within tolerance as measured by the system of FIGURE 2, it is often desirable to know immediately when an out of tolerance dimension is encountered. Such a system could set off an alarm, interrupt the operation of machinery, etc. For this purpose I have included in my coincidence system the circuit of FIGURE 8, which incorporates the gate circuit of FIGURE 7. As shown therein, a second type 5696 thyratron V2 has its control grid V2c connected to the input from oscillator 38 (FIGURE 2) through a current limiting resistor R11; this resistor may have a value of approximately 100,000 ohms, and the grid is negatively biased by battery 25 through resistor R5. Preferably, a 1,000 ohm resistor R12 is also connected to battery 25, and a type 1N91 diode D3 is connected across resistances R5 and R12 to conduct in the direction indicated. A 25 microfarad capacitor C4 is connected to conduct the gate pulse input from amplifier 26 to the junction of diode D3 and resistor R12.

Thus, in operation, if the signal from oscillator 38 arrives before the gate pulse, it will see in parallel with resistor R5 the series combination of resistor R12 and the forward resistance of diode D3. However, the combined resistance of resistor R12 and diode D3 in parallel with resistor R5 is such as to result in a signal amplitude insufficient to trigger thyratron V2. During the presence of the gate pulse, however, a positive voltage is imposed on the junction of diode D3 and resistor R12, and the diode is biased to cutoff. The signal arriving from oscillator 38 is thus shunted by resistor R5 only, and its level is sufficient to trigger the thyratron V2.

For proper operation of the circuit, a plate voltage should be applied across thyratron V2 during the entire period the gate pulses from the generator 30 (FIGURE 2) may be present in the grid circuit of the tube; such voltage should be interrupted once each cycle in order to extinguish the tube if it has fired. Thus a relay coil Ry1 may be inserted in the plate circuit of the thyratron with a holding capacitor C5 thereacross. The capacitance of capacitor C5 and the coil resistance of the relay are chosen with a time constant such that, when the thyratron fires to develop a net charge across the capacitor in response to the voltage drop across the relay coil, the charge on the capacitor will serve to hold the relay for one cycle. Thus, if during the next cycle the reading is out of tolerance and the thyratron does not fire, the relay will drop and an appropriate signal may be derived therefrom.

Still referring to FIGURE 7, I prefer to obtain the plate voltage for tube V2 from generator 28 to insure correct cyclic rate. The output of the generator is fed to a conventional half wave rectifier comprising a suitable diode D4, a 16 microfarad filtering capacitor C6 and a loading resistor R13 which may be of approximately 33,000 ohms; thus the voltage developed across resistor R13 is essentially D.-C. in form. A second resistor R14 of approximately 10,000 ohms is between resistor R13 and ground and is also in parallel with a diode D5. Resistor R14 and diode D5 are coupled to the output of generator 28 by a capacitor C7 which with the above-stated components may be .5 microfarad. Thus there is developed across resistor R14 a voltage having substantially the form of a clipped sine wave with the upper halves missing, the phase of this voltage depending upon the values of capacitor C7 and resistor R14. The voltage applied to the plate of thyratron V2 through the coil of relay Ry1 is the sum of the voltage across resistors R13 and R14.

The circuit through the thyratron V2 is completed by a current limiting resistor R15 of approximately 470 ohms connecting the relay coil and plate V2a and by connecting the cathode V2b directly to ground with screen grid V2d tied directly thereto. Prior to my invention, properly phased interrupted voltage was applied to a thyratron plate by running ordinary A.-C. through a conventional RC or LC filter and applying it directly to the tube. However, where appreciable power is to be drawn, such an arrangement requires large size components, particularly at low frequencies, and also entails considerable dissipation of power in the resistive elements of the filter. On the other hand, my circuit uses a small number of low cost components readily packaged in a small space.

The operation of relay Ry1 in combination with thyratron V2 suggests other uses to which my system may be put. Several units may be "stacked" with their gate pulses occurring immediately one after another. The relays Ry1 may thus be arranged to operate individual counters whose readings would then provide the statistical distribution of the various readings obtained. Or two or more units may be arranged with overlapping gate pulses. In such case one contact on each of the relays is connected in series to provide an output when a reading is within the region of overlap (with a narrow tolerance range) and another set of relay contacts on each relay is arranged to give individual output (e.g. within a broader tolerance range).

Thus I have described a coincidence system in which the exact time relationship between two events may be readily determined. In my system a gate pulse is generated in response to the occurrence of one of the events and a second signal is generated in response to the other. Both signals are applied to the controls of a gate, coincidence of the signals being required for operation of the gate, which, once it opens and starts conducting, remains in that condition until the end of the gate pulse. By integrating the output of the gate, the interval during which it conducts may be determined and therefore also the interval between the occurrences of the events. I have also described an embodiment of this system which may be used in making various physical measurements, e.g. the thickness of an object. In such application this system is capable of rapid repeated measurements which may be readily averaged to provide valuable statistical information for use in control of a continuous process. The output signal is in optimum form for use with recording devices, servo-mechanisms, etc. Moreover, I have described a novel gate circuit for use in this system together with novel circuitry providing immediate indication of an out of tolerance reading. Further, I have disclosed a circuit which may be used to generate gate pulses of varying widths from a sine wave or other alternating input signal. This circuit, which is simple in construction, may also be used to form exceedingly narrow pulses from various input wave forms.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. In an instrument for measuring the thickness of an object, the combination of a signal generator adapted to provide a control signal whose potential varies at a given rate, an oscillator, a transducer, means adapted to couple the output of said oscillator to said transducer whereby said transducer converts electrical energy of said oscillator into acoustic energy, means adapted to acoustically couple said transducer to said object, means for varying the frequency of oscillation of said oscillator in accordance with the potential of the signal from said signal generator whereby the frequency may pass through an acoustic resonance in said object corresponding to a given thickness thereof, means including said oscillator for generating an indication signal in response to the occurrence of said resonance, a gate pulse generator, means connecting the output of said signal generator to the input of said gate pulse generator, said gate pulse generator being adapted to generate a gate pulse beginning at a predetermined level of the potential of said control signal from said signal generator and having a predetermined length whereby the limits of said gate pulse correspond to predetermined thicknesses of said object, a gate circuit, providing a conducting path therethrough upon operation thereof, said gate circuit having a non-latching input and a latching input, said gate being dependent for operation upon concurrent activation of both inputs, said conducting path connected to a source of potential, said gate pulse generator connected to said non-latching input for activation thereof, said indication signal connected to said latching input for activation thereof, an integrator connected to the output of said gate, whereby the output of said integrator is a measure of the interval between said indication signal and the end of said gate signal and therefore is indicative of the thickness of said object.

2. The combination defined in claim 1 in which said source of potential is said gate pulse.

3. The combination defined in claim 1 in which said gate circuit includes the plate-cathode and grid-cathode circuits of a thyratron and said latching input includes the plate-cathode circuit thereof.

4. The combination defined in claim 1 including an averaging device for averaging the output of said integrator, whereby the output of said averaging device indicates the average of a number of thickness readings.

5. In a thickness measuring device, the combination of a source of alternating current, a gate pulse generator connected to convert alternatng current from sad source into a series of gate pulses each of which begins at the same point in a cycle of the alternating current input to said generator, phasing means connected between said source and said gate pulse generator and thereby adapted to vary the point along each cycle at the output of said source when a gate pulse is initiated, an oscillator, a transducer powered by said oscillator, frequency sweeping means connected to sweep the frequency of said oscillator in accordance with the output of said alternating current source, a coincidence gate circuit activated by the output of said gate pulse generator and the change in characteristics of said transducer resulting from acoustical resonance in an object coupled thereto, the frequency of said acoustical resonance corresponding to the thickness of said object, said gate circuit being arranged so that once activated it remains activated until the end of the gate pulse with which it was activated, and an integrator connected to the output of said gate circuit, the initiation and ending of each of said gate pulses corresponding to the tolerance limits on the thickness of said object, whereby the integral of the conduction time of said gate circuit indicates the proximity of the thickness of said object to the tolerances thereof.

6. A thickness measuring device as defined in claim 5 in which said pulse generator includes means for varying the duration of each of said pulses.

7. In apparatus for measuring the thickness of a tested material, the combination of a gate pulse generator including means for varying the duration of the pulses generated thereby, an oscillator, a transducer coupled to and electrically excited by said oscillator, frequency sweeping means connected to vary the frequency of said oscillator at a predetermined rate, means for adjusting the timing of said gate pulses with respect to the frequency of said oscillator, a thyratron having a plate-cathode circuit connected to the output of said gate pulse generator, said transducer undergoing a change in electrical characteristics when the frequency of said oscillator passes through an acoustical resonance of a load connected to said transducer, means for applying to the grid-cathode circuit of said thyratron a signal indicative of said change in characteristics, said thyratron firing upon concurrent application of said signal and said gate pulse thereto, and integrator means coupled to the plate-cathode circuit of said thyratron, whereby said integrator means indicates the proximity of the thickness of said object to thicknesses corresponding to the frequencies of said frequency sweeping means at the beginning and end of each of said gate pulses.

8. In apparatus for measuring the distance between two surfaces, the combination of a pulse generator adapted to emit a series of gate pulses, an oscillator, frequency sweeping means connected to vary the frequency of said oscillator, a transducer energized by said oscillator, a coincidence gate circuit having a non-latching input coupled to the output of said pulse generator and a latching input connected to receive and be activated by a change in the electrical characteristics of said transducer resulting from acoustical resonance between said two surfaces when said transducer is acoustically coupled to one of said surfaces, and an integrator coupled to the output of said gate circuit to indicate the time relationship between said change in transducer characteristics and the end of the gate pulse applied to said gate circuit during the time interval in which said transducer characteristics change, means synchronizing said pulse generator with said frequency sweeping means so as to initiate said gate pulses at a frequency of said oscillator corresponding to a first tolerance limit of the distance between said surfaces, the length of each of said gate pulses being such that the end of each pulse occurs at an oscillator frequency corresponding to the other limit of distance.

9. In a thickness measuring device adapted to repeatedly determine whether the thickness of an object is between two tolerance limits by cyclically varying the acoustical output frequency of a transducer coupled to said object, the combination of an alternating current source, an oscillator, an electroacoustical transducer powered by said oscillator, whereby when said transducer is acoustically coupled to said object it emits a first signal whenever an acoustic resonance occurs within said object, frequency sweeping means for cyclically varying the frequency of said oscillator in response to current from said source, means for periodically generating gate pulses in accordance with the frequency of said source, the beginning and end of each of said gate pulses occurring at the times when the frequency of said oscillator corresponds to thicknesses of said object at said tolerance limits, a first gate circuit having a first latching input and a first non-latching input, said first non-latching input being coupled to the output of said pulse generator, means for applying said first signal to said first latching input, coincidence of the signals at its inputs being required to initiate operation of said first gate circuit, integrating means connected to the output of said first gate circuit and thereby adapted to indicate the duration of operation thereof, a second gate circuit having a second nonlatching input and a second latching input, means for cyclically applying current from said source to said second non-latching input for periods including the duration of each of said gate pulses, a third gate circuit connected to emit an activation signal during the coincidence of said first signal and a gate pulse, means coupling said activation signal to said second latching input, and relay means connected to the output of said second gate circuit to be operated by operation of said second gate circuit, said relay means including holding means having a holding period greater than the period of said alternating current source and less than the period of a substantial number of cycles of said source.

10. In thickness measuring apparatus, the combination of a source of alternating current, a gate pulse generator connected to emit gate pulses in accordance with the frequency of said alternating current source, a transducer gage including an oscillator, an electroacoustical transducer powered by said oscillator and a frequency sweeping circuit connected to sweep the frequency of said oscillator at a rate corresponding to the frequency of said alternating current source, said gage being connected to emit a resonance signal whenever the frequency of said oscillator passes through an acoustical resonance of an object acoustically coupled to said transducer, a variable phasing circuit adapted to vary the relative phase of the voltage from said source applied to said pulse generator and said frequency sweeping means, a thyratron gate having its plate-cathode circuit coupled to the output of said gate pulse generator and its grid-cathode circuit connected to receive said resonance signal, and indicating means responsive to average plate-cathode current in said thyratron, the length of each of said gate pulses corresponding to the difference in frequency between the limits thereof associated with maximum and minimum tolerance limits of the thickness of said object.

11. The combination defined in claim 10 including a second thyratron gate, a coincidence gate circuit connected to apply a coincidence signal to the grid-cathode circuit of said second thyratron gate during such times as said resonance signal and a gate pulse coincide, means for applying to the plate-cathode circuit of said second thyratron a signal from said alternating current source during a period including the duration of each of said gate pulses, a relay having a winding connected in series with the plate-cathode conduction of said second thyratron and a capacitor in parallel with said winding, said capacitor having sufficient capacitance to hold said relay for a period greater than the interval between successive gate pulses and less than the interval between a substantial number of said gate pulses.

12. The combination defined in claim 11 in which said gate pulse generator has a variable pulse width.

References Cited in the file of this patent

UNITED STATES PATENTS

| | | |
|---|---|---|
| 2,431,234 | Rassweiler et al. | Nov. 18, 1947 |
| 2,562,449 | De Lano | July 31, 1951 |
| 2,736,193 | Van Valkenburg et al. | Feb. 28, 1956 |
| 2,800,789 | Henry | July 30, 1957 |
| 2,802,942 | Stellmacher et al. | Aug. 13, 1957 |
| 2,806,139 | Le Clerc | Sept. 10, 1957 |
| 2,883,860 | Henry | Apr. 28, 1959 |